United States Patent Office 3,324,176
Patented June 6, 1967

3,324,176
POLYALKYLENE GLYCOL ETHERS CONTAINING TERMINAL UREA GROUPS
Helmut Kirschnek, Georg von Finck, and Mathieu Quaedvlieg, Leverkusen, Germany, assignors to Farbenfabriken Bayer Aktiengesellschaft, Leverkusen, Germany, a German corporation
No Drawing. Filed Oct. 15, 1963, Ser. No. 316,467
Claims priority, application Germany, Oct. 19, 1962,
F 38,088
2 Claims. (Cl. 260—553)

The present invention relates to polyalkylene glycol ethers containing urea groups; more particularly it concerns polyalkylene glycol ethers containing urea groups, of the formula

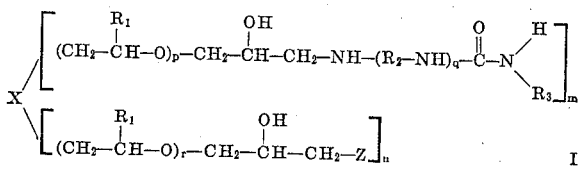

in which X stands for nitrogen or for an at least divalent organic radical, $R_1$ stands for hydrogen or an alkyl radical $R_2$ stands for an aliphatic, cycloaliphatic or aromatic radical, $R_3$ stands for hydrogen, an alkyl radical, a hydroxyalkyl radical, an alkoxy alkyl radical or an aryl radical and Z stands for hydrogen, for a hydroxyl group or for an organic or inorganic radical, while $m$ is a number from 2 to 6, $n$ is a number from 0 to 4, $p$ is a number from 1 to 100, $q$ is a number from 0 to 4 and $r$ is a number from 1 to 100. Among the organic or inorganic radicals which can be represented by Z, there are to be understood, for example, aliphatic, cycloaliphatic, aromatic or heterocyclic radicals, the radical of an alkylamine or dialkylamine, a quaternary alkylammonium group, a fatty alcohol, a fatty acid, a fatty acid amide, a polyamine, a polyimine, a polyester, a polyether or a silicone, and also halogen or the groups —COOH and —NH$_2$. According to the present invention the polyalkylene glycol ethers of the Formula I can be produced by reacting polyalkylene glycol ethers of the formula

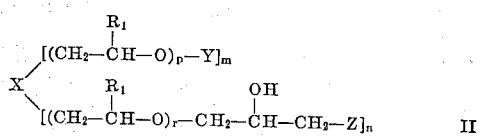

in which X, $R_1$, Z, $m$, $n$, $p$ and $r$ have the aforesaid significance and Y is $$-CH_2-CH-\!-\!-CH_2 \quad \text{and} \quad -CH_2-CH-CH_2-Cl$$
$$\phantom{-CH_2-CH-\!-\!-CH_2}\underset{O}{\diagdown\!\diagup} \phantom{xxxx} \underset{OH}{|}$$

with ammonia or polyamines which contain at least two primary amino groups, and converting at least two of the primary amino groups present in the reaction product formed, into urea groups.

The polyalkylene glycol ethers of the Formula I, containing urea groups, can also be obtained by reacting the polyalkylene glycol ethers of the Formula II in a single process step with urea compounds which contain an aminoalkyl group as a substituent.

The polyalkylene glycol ethers of the Formula II serving as starting materials are accessible, for example, by reacting compounds which possess at least two hydrogen atoms reactive to alkylene oxides, with alkylene oxides, reacting epihalohydrins on the resulting alkoxylation products and, if desired, splitting off hydrogen halide from the chlorohydrin compounds formed.

Of compounds which possess at least two hydrogen atoms reactive to alkylene oxides, examples are:

(a) Polyhydroxy compounds, especially aliphatic divalent alcohols with preferably 2 to 6 carbon atoms, such as ethylene glycol, propylene glycol, and butylene glycol; ether glycols such as diethylene glycol and triethylene glycol, alcohols of higher valencies such as glycerol, trimethylol-propane, pentaerythritol, and sorbitol, and mono- or di-saccharides of the type of glucose and saccharose as well as aromatic compounds with at least two hydroxyl groups, e.g., resorcinol or 4,4'-dihydroxydiphenyl, and finally also the esters or ethers of such polyhydroxyl compounds containing two or more hydroxyl groups;

(b) aliphatic, cycloaliphatic or aromatic di- or polycarboxylic acids, such as succinic acid, adipic acid, trimellitic acid;

(c) polyamines, especially saturated aliphatic amines containing primary and/or secondary amino groups, such as ethylene diamine, propylene diamine and butylene diamine, diethylene triamine, triethylene tetramine, tetraethylene pentamine and polyethylene imine, as well as condensation products of polyamines with fatty acids;

(d) Compounds which contain simultaneously different functional groups of the aforesaid type, e.g., alkanolamines, such as ethanolamines, diethanolamine and triethylanolamine, hydroxycarboxylic acids such as lactic acid and citric acid, aminocarboxylic acids such as alanine, glycocoll, phenolcarboxylic acids and aminophenols.

Examples of alkyene oxides are ethylene oxide, propylene oxide, butylene oxide or their mixtures. The principle example of an epihalohydrin is an α-epichlorohydrin.

Polyalkylene glycol ethers of the Formula II serving as starting materials which contain groupings for which Z stands are obtainable for example by reaction of the chlorohydrin compounds or their glycidyl ethers with reaction components containing the grouping Z.

Polyamines suitable for carrying out the process according to the invention, which contain at least two primary amino groups, are for example ethylene diamine, propylene diamine, 1,6-hexamethylenediamine, phenylene diamine, diethylene triamine, triethylene tetramine, tetraethylene pentamine, bis-(3-aminopropyl)-methylamine and polyethylene imine.

The conversion of the primary amino groups into urea groups can proceed according to methods known as such, e.g., by means of potassium cyanate, urea, nitro urea and isocyanates or also by the action of phosgene and subsequent reaction of the isocyanate group-containing reaction products with ammonia or primary amines.

As urea compounds which contain amino alkyl groups, examples are amino ethyl urea, 1-amino-hexamethylene urea or 1-amino-6,11-diureido-undecane.

The polyalkylene glycol ethers containing urea groups produced according to the invention which are in general thick fluids or solids, and can be dissolved or emulsified in water, are capable of a large number of applications. They can be used as plasticizing additives to urea-formaldehyde resins; they can be condensed with lower aldehydes, e.g., formaldehyde, even at 80–100° C., and thus under relatively mild conditions, to form water-insoluble resins and therefore used with advantage in the coating of film material.

The following examples serve to illustrate the invention without, however, limiting its scope, the parts given are parts by weight.

*Example 1*

96.3 parts (0.1 mol) of the polyethylene glycol triglycidyl ether, produced from 1 mol of 1,1,1-trimethylol propane by reaction with 15 mol of ethylene oxide, followed by the reaction of 3 mol of α-epichlorohydrin and subsequent splitting off of hydrogen chloride and possessing an epoxy-oxygen content of 4.1%, are heated with 42.4 parts (0.08 mol) of technical dioctadecylamine (equivalent weight 530) for 1½ hours with stirring at 120° C. About 30% of the originally present epoxy groups are thereby reacted. The remaining excess epoxy groups are then reacted with 23.2 parts (0.2 mol) of 1,6-hexamethylene diamine in the course of 2 hours at 95° C. The reaction mixture is then cooled, mixed with 19.2 parts (0.2 mol) of 38% aqueous hydrochloric acid and with a solution of 16.3 parts (0.2 mol) of potassium cyanate in 1,000 parts of water, and heated with stirring for a further 2½ hours to 95° C., whereby sufficient water is added to the mass so that the stirrability is maintained. The reaction mixture is then washed twice with a hot common salt solution; the upper phase is separated and substantially freed from water in vacuum at about 80° C. The reaction product obtained in this way to which the following constitution can be attributed, is a thick fluid at normal temperature and gives a clear solution in dilute acetic acid.

for an hour at 50° C. and then for an hour at 70° C. The resulting reaction product is then caused to react, with the addition of hydrochloric acid, with potassium cyanate and is then worked up as described in Example 3.

The resulting reaction product is well soluble in water and dilute aqueous acids; by drying, dissolving in ethanol, filtering and evaporating off the ethanol it can be substantially freed from the adhering common salt.

*Example 5*

140.3 parts (0.1 mol) of the polyethylene glycol triglycidylether produced from 1 mol of 1,1,1-trimethylol propane by reaction with 25 mol of ethyleneoxide followed by the action of 3 mols of α-epichlorohydrin and subsequent splitting off of hydrogen chloride, and having an epoxy-oxygen content of 2.9%, are reacted according to the details of Example 1 first with dioctadecylamine, then with 1,6-hexamethylene diamine and finally, with addition of hydrochloric acid, with potassium cyanate.

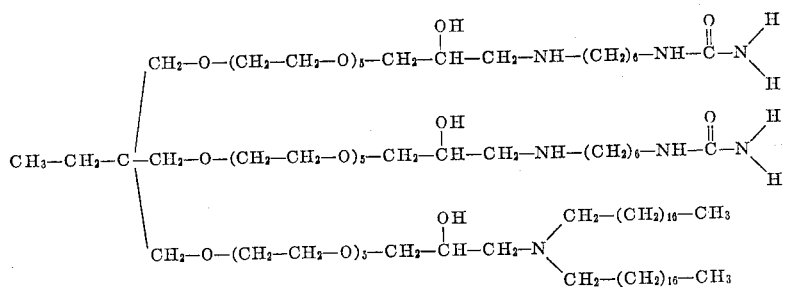

*Example 2*

96.3 parts of the polyethylene glycoltriglycidyl ether described in Example 1 are heated with 34.8 parts (0.3 mol) of 1,6-hexamethylene diamine for 2 hours with stirring at 95° C. The reaction mixture is then cooled, mixed with 28.9 parts (0.3 mol) of 38% aqueous hydrochloric acid and a solution of 24.3 parts (0.3 mol) of potassium cyanate into 200 parts of water and further heated with stirring for 2½ hours at 95° C. The water is then evaporated off in vacuum at about 80° C., the residue stirred with ethyl alcohol, the alkaline solution is filtered off from remaining undissolved salt and then concentrated by evaporation.

The reaction product obtained is a thick fluid at room temperature and gives a clear solution in dilute acetic acid. Potentiometric titration in anhydrous glacial acetic acid with a 0.2 molar HBr-solution shows an average of 0.9–1.2 urea groups for each titratable amino group.

*Example 3*

251 parts (0.1 mol) of the polyethylene glycol triglycidylether produced from 1 mol of 1,1,1-trimethylol propane by reaction with 50 mol of ethylene oxide followed by the action of 3 mol of α-epichlorohydrin and subsequent splitting off of hydrogen chloride, and having an epoxy-oxygen content of 1.9%, are reacted according to the instructions of Example 2 first with 1,6-hexamethylene diamine and thereafter, with addition of hydrochloric acid, with potassium cyanate; in the reaction with potassium cyanate sufficient water is expediently added to the material so that the reaction mixture can be well stirred. Common salt is then added in the hot and the separated product is washed twice with a hot common salt solution. The reaction product thus obtained which still contains water and common salt, is a viscous fluid and is well soluble in water or dilute aqueous acids.

*Example 4*

251 parts (0.1 mol) of the polyethylene glycol triglycidylether described in Example 3 are heated with 0.3 mol of a concentrated aqueous ammonia solution first The working up of the reaction mixture proceeds then likewise as described in Example 1.

*Example 6*

The procedure described in Example 5 is followed but, instead of dioctadecylamine, 66.1 parts (0.1 mol) are used of a condensation product from 2 mol of stearic acid with 1 mol of dipropylene triamine.

*Example 7*

276.7 parts (0.1 mol) of the polyethylene glycol triglycidylether produced from 1 mol of pentaerythritol monooctadecylether by reaction with 50 mols of ethylene oxide, followed by the action of 3 mols of α-epichlorohydrin and subsequent splitting off of hydrogen chloride and having an epoxy-oxygen content of 1.4%, are reacted according to the details given in Example 2 first with 1,6-hexamethylene diamine and then, with addition of hydrochloric acid, with potassium cyanate; in the reaction with potassium cyanate sufficient water is expediently added to the mass so that the reaction mixture can be well stirred. Common salt is then added in the hot and the separated product is washed twice with hot common salt solution. The reaction product thus obtained which still contains water and salt, is a viscous fluid and is well soluble in water or dilute aqueous acids.

*Example 8*

183.8 parts (0.1 mol) of the chlorohydrin compound described below are heated with 35.3 parts (0.4 mol) of 1,4-tetramethylene diamine for 2 hours at 95° C. 32.6 parts (0.4 mol) of potassium cyanate are then added to the reaction product in the form of an aqueous solution, and the mixture is heated for 2½ hours at 95° C., sufficient water being additionally added as required so that the mixture can be well stirred. The reaction product is then washed twice with a hot common salt solution, the upper phase is separated off, the water is evaporated off in vacuum at 80° C., the residue is stirred with ethyl alcohol, the alcoholic solution is filtered off from remaining undissolved salt and then concentrated by evaporation. The product thus obtained is well soluble in water, in dilute aqueous acids as well as in polar organic solvents.

The chlorohydrin compound used is produced in the following manner;

1 mol of pentaerythritol is first caused to react in an autoclave at 140° C. first with 4 mols of propylene oxide and then with 25 mols of ethylene oxide. After the addition of 1% by weight of boron fluoride/glacial acetic acid, the reaction product is gradually mixed at 80° C. with 0.4 mol of α-epichlorohydrin and held at this temperature for 1 hour.

*Example 9*

251 parts (0.1 mol) of the polyethylene glycol triglycidylether set forth in Example 3 are heated with 30.9 parts (0.3 mol) of β-aminoethyl urea for 2 hours at 100° C. The reaction product formed is washed twice with a hot common salt solution, then dried in vacuum at 60° C. and then stirred with ethanol; the alcoholic solution is filtered off from the common salt and then concentrated by evaporation. A product is obtained which is well soluble in water, in dilute aqueous acetic acid as well as in polar organic solvents.

We claim:
1. A compound of the formula

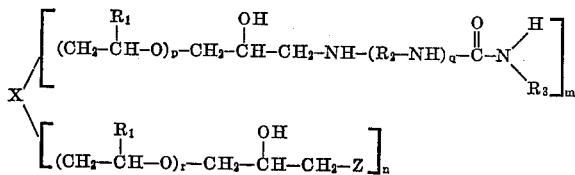

wherein X is selected from the group consisting of

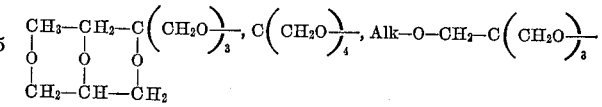

and wherein Alk is alkyl; $R_1$ is selected from the group consisting of hydrogen and methyl; $R_2$ is selected from the group consisting of alkylene having 2–6 carbon atoms, phenylene,

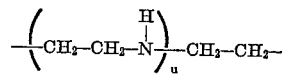

wherein $u$ is an integer of from 1 to 3 and

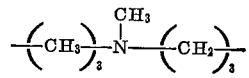

$R_3$ is selected from the group consisting of hydrogen and alkyl containing from 2–11 carbon atoms; Z is selected from the group consisting of hydrogen, hydroxyl, halogen, —COOH, —NH$_2$, distearylamino and distearoylamidopropyl amino; $m$ is a number from 2 to 4; $n$ is a number from 0 to 1; $p$ is a number from 5 to about 16.67; $q$ is a number from 0 to 1 and $r$ is a number from 0 to about 8.33 with the proviso that the sum of $m+n$ equals 3 or 4.

2. The compound of the formula:

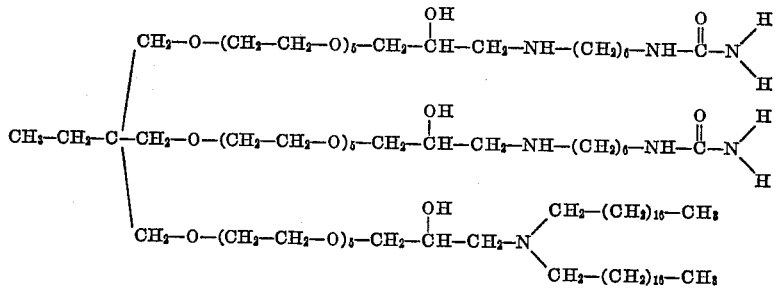

No references cited.

ALEX MAZEL, *Primary Examiner.*

JAMES H. TURNIPSEED, *Assistant Examiner.*

UNITED STATES PATENT OFFICE
CERTIFICATE OF CORRECTION

Patent No. 3,324,176                                June 6, 1967

Helmut Kirschnek et al.

It is hereby certified that error appears in the above numbered patent requiring correction and that the said Letters Patent should read as corrected below.

Column 6, lines 4 to 7, the formulas should appear as shown below instead of as in the patent:

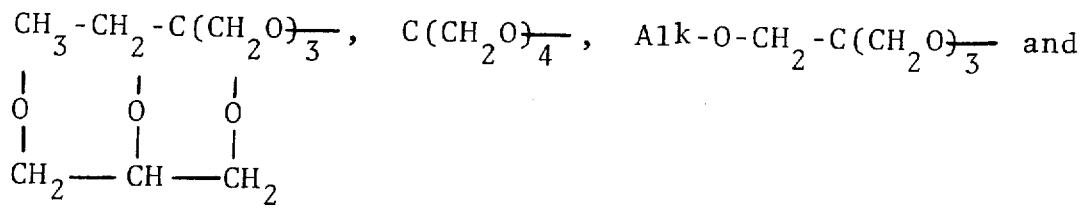

line 9, strike out "and"; lines 24 and 25, the formula should appear as shown below instead of as in the patent:

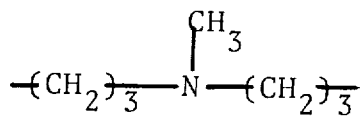

Signed and sealed this 25th day of June 1968.

(SEAL)
Attest:

EDWARD M. FLETCHER, JR.                    EDWARD J. BRENNER
Attesting Officer                              Commissioner of Patents